March 17, 1964  G. BALLIN  3,125,250
METERING DISPENSER FOR COLLAPSIBLE CONTAINERS
Filed Jan. 18, 1960
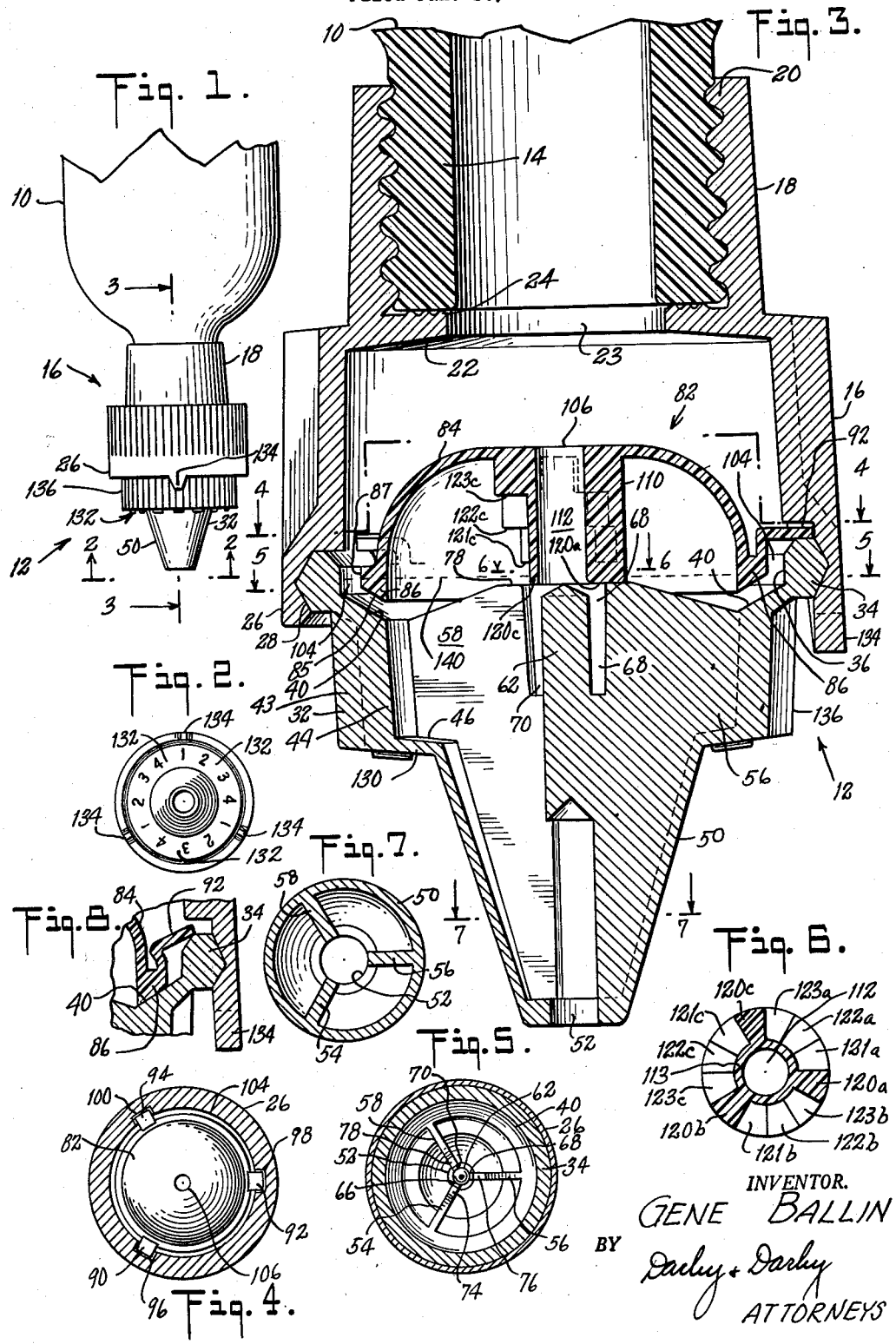
INVENTOR.
GENE BALLIN
BY Darby & Darby
ATTORNEYS

United States Patent Office 3,125,250
Patented Mar. 17, 1964

3,125,250
METERING DISPENSER FOR COLLAPSIBLE CONTAINERS
Gene Ballin, Valley Stream, N.Y., assignor to Dosamatic Dropper Corporation, Valley Stream, N.Y., a corporation of New York
Filed Jan. 18, 1960, Ser. No. 3,116
16 Claims. (Cl. 222—96)

This invention relates to a fluid dispensing fitment for a container and more particularly to a closure device intended for use primarily with a flexible or collapsible container and suitable for accurately dispensing liquids and fluids.

Collapsible or flexible containers commonly known as "squeeze bottles" are being increasingly used in the consumer market and laboratory work where dispensing small amounts of fluids is desired. Conventionally these containers use a closure having a small orifice therein, and squeezing or compressing the body of the collapsible container increases the pressure on the fluid therein thus ejecting a portion of the contents from the container through the orifice, with the quantity ejected depending upon the intensity of the compressive force and the time duration during which this force is exerted on the fluid. The fluid ejected may be atomized or be in drops or in a stream. In this manner collapsible containers have been increasingly used for anti-perspirants, perfumes, nosedrops and other medicaments or preparations used in small amounts.

In many instances it is desirable, if not essential, that a precise, measured quantity of fluid be dispensed. Prior art metering devices have been extremely unreliable in dispensing measured amounts of fluid from containers of various kinds with any degree of accuracy or consistency. The quanity of fluid ejected from the container with these prior art metering devices was usually a matter of happenstance and merely approximated the defined quantity of fluid. Further, these prior art metering devices required a complex construction making the cost prohibitive for use with a competitive product and provided unsatisfactory performance and little reliability in accuracy. The lack of a satisfactory relatively low-cost metering device for dispensing fluids from a container has prevented the wider use of the flexible type containers where a more precise control is required over the aspirated or dispensed output such as with medicaments, cosmetic preparations and reagents.

My prior applications Serial No. 838,678 for Liquid Dropper Assembly filed September 8, 1959, now United States Patent No. 3,030,938, and Serial No. 861,498 for "Bottle Dropper and Closure" filed December 23, 1959, disclose and claim a structure for use with a bottle dropper for uniformly and accurately controlling the quantity of liquid aspirated or dispensed from the dropper, and the present invention utilizes features and principles disclosed in said application, as adapted for dispensing from flexible containers.

Accordingly, it is an object of the present invention to provide a dispenser or fitment for a compressible container which has quickly adjustable and accurate means for metering a selected dosage.

A further object of the present invention is to provide a dispenser or fitment for a container having a positive discharge control so as to accurately determine the number of drops of liquid which can be repeatedly aspirated or ejected from the container.

A still further object of the invention is to provide a dispenser or fitment for a flexible-wall container and having precise metering and indicating means which are adjustable at will for determining the quantity of fluid to be dispensed from the container, regardless of the pressure exerted on the container.

Another object is to provide a dispenser or fitment for a liquid container and having a precise metering means for preselecting the desired amount of liquid to be dispensed and also permitting continuous dispensing of an unmeasured quantity of fluid if desired.

A further object is to provide a metering dispenser for a container which may be readily molded from plastic material either in whole or part and contains relatively few pieces, and which can be easily installed on containers.

Still another object of this invention is to provide an improved dispensing fitment for flexible containers incorporating the above features and which is capable of easy manufacture and assembly, is sanitary and of simple construction and operation, and is durable and easy to use even for long periods without loss of accuracy.

These and other objects and advantages of the present invention will be more readily apparent from the following description of preferred embodiments thereof taken with the accompanying drawings wherein, FIGURE 1 is broken away, elevational view showing the general arrangement of a metering dispenser fitment in accordance with the present invention in operative position on a flexible liquid container;

FIGURE 2 is a plan view taken along line 2—2 of FIGURE 1 showing the outer upper surface of the dispenser fitment;

FIGURE 3 is an enlarged, fragmentary cross-sectional, elevational view taken along line 3—3 of FIGURE 1 showing the dispensing apparatus in its quiescent state and in inverted position prior to dispensing fluid from the container;

FIGURE 4 is a transverse cross-sectional view taken along line 4—4 of FIGURE 3;

FIG. 5 is a transverse cross-sectional view taken along line 5—5 of FIGURE 3;

FIGURE 6 is a transverse cross-sectional view taken along line 6—6 of FIGURE 3;

FIGURE 7 is a transverse cross-sectional view taken along line 7—7 of FIGURE 3; and FIGURE 8 is a fragmentary cross-sectional view of part of the dispensing apparatus similar to FIGURE 3 with the parts occupying positions during the dispensing operation.

Referring now to the drawings, numeral 10 generally designates a conventional compressible or flexible bottle, vessel or container with which a dispensing fitment 12 constructed in accordance with the present invention may be used, whose walls are compressible and flexible, as when molded from a flexible, resilient pliable material. The term "compressible" or "squeeze bottle" will be understood to refer to a type of bottle which will normally hold a predetermined shape, but whose side walls yield sufficiently to pressure imposed thereon, usually manually by the user, to permit them to move toward each other. Such containers are commonly made of plastic material such as polyethylene. While the present invention is illustratively shown used with a compressible container, it may equally well be used with other types of containers capable of imposing a pressure on the contents within the container by the user. Container 10 may contain a liquid or other contents to be dispensed by fitment 12 and conventionally has a threaded neck or mouth portion 14. As shown in the drawings, bottle 10 and dispenser assembly 12 are in the inverted position, ready for dispensing. For purpose of convenient reference, the terms "upward" and "downward" and derivatives thereof will refer to the position of the apparatus as appearing in the drawings to which reference is made. Also, the terms "inward" and "outward" and derivatives thereof will refer respectively to directions toward and away from the geometric center or axis of the container.

As shown best in FIGURE 3, dispenser assembly 12 has a hollow cap or body 16 having an upwardly extending skirt portion 18. The inner surface of skirt portion 18 is advantageously provided with threads 20 which are adapted to engage with the corresponding threads of neck portion 14 of container 10. Preferably the outer peripheral surface of cap 16 is axially grooved, as best shown in FIGURES 1 and 3 to aid in gripping and rotating fitment 12. On the inner peripheral surface of cap 16 and disposed at the bottom of skirt portion 18 is an interior transverse annular flange 22 adapted to overlie the lip of neck 14 of container 10 when in assembled position as is shown in FIGURE 3. The inner peripheral edge of flange 22 defines an aperture 23 communicating with the interior of container 10. The upper surface of flange 22 abutting the outer lip of container neck 14 has a series of resilient annular ribs or protuberances 24, which are disposed in such radial relation to skirt 18 that upon threading fitment 12 on container neck 14, ribs 24 engage the rim of neck portion 14 as seen best in FIGURE 3 to provide a positive seal. While three ribs have been found to provide positive sealing between fitment 12 and container neck 14, the number may be varied depending on the dimensions and material used and the results desired. Adjacent the lower end 26 of cap 16 is an interiorly facing V-shaped annular groove 28, as seen best in FIGURE 3.

Disposed substantially coaxial with respect to cap 16 is a nozzle element 32. Adjacent the upper edge of nozzle 32 and on the outer peripheral surface thereof is an outwardly projecting circumferential flange or rim 34. The peripheral surface of flange 34 is V-shaped to fit interior groove 28 in flange 26, and is rotatably mounted therein for securing nozzle 32 and cap 16 together with an airtight seal while permitting relative rotation. The interior peripheral surface of flange 34 is relatively cylindrical in shape as shown at 36. Flange 34 is connected to the body of nozzle element 32 by a downwardly and inwardly tapered annular section having a portion of a conical surface 40 extending from the lower circumferential edge of the inner cylindrical surface 36 of flange 34. At the bottom edge of surface 40 and extending downwardly therefrom is a substantially cylindrical or slightly tapering section 43 having an inner surface 44 and terminating in a transverse inward flange or step section 46. Extending downwardly from step 46 is a suitably inward tapered portion 50 having a central discharge opening or orifice 52 in the transverse end surface 53. The size of opening 52 is determined by the character of the liquid and intended use, and preferably is an opening of capillary dimension, which for a typical application may be about 1/32 inch in diameter. Integrally mounted on the interior surface 44 of cylindrical section 43, step 46 and tapered portion 50 of nozzle 32 and extending radially inward therefrom are a plurality of vanes 54, 56, 58, advantageously three in number, as shown best in FIGURES 3 and 5. Radial vanes 54, 56, and 58 connect to and are preferably integral with a cylindrical centerpost 62, which is coaxial with nozzle 32 and cap 16. Adjacent post 62, each of vanes 54, 56 and 58 has a respective downwardly directed groove 66, 68, 70 therein of substantially the same depth. The lower end of centerpost 62 is spaced from the lower transverse surface 53 of tapered portion 50 as shown in FIGURE 3 for providing a space between vanes 54, 56 and 58 in free communication with orifice 52. Each of the upper edges of vanes 54, 56 and 58 adjacent their respective downward grooves 66, 68 and 70 has a flat transverse portion respectively indicated at 74, 76 and 78 which portions lie in a transverse plane. The upper edges or surfaces of vanes 54, 56 and 58 between their respective transverse portions 74, 76 and 78, and cylindrical wall section 44 are downwardly tapered and abut and join to beveled surface 40. While nozzle 32 with the vanes may be molded or fabricated from one piece as shown, if desired, the vanes or arms may be molded or fabricated separately and be held within the nozzle in any convenient manner. Further, while vanes 54, 56 and 58 have been shown extending the full length of nozzle 32, they may extend downwardly for any convenient distance.

Dispenser assembly 12 is completed by a bulb piece or diaphragm indicated as a whole by reference character 82 which encloses a space above nozzle 32 and in cooperation with nozzle 32 contains the metering device. Advantageously bulb 82 has a comparatively thin, flexible, generally domed central portion 84 and has on its outer peripheral surface adjacent its lower edge, an outwardly projecting circumferential ridge or flange 86. Extending upwardly from flange 86 are preferably three generally L-shaped arms 90, 92 and 94 as shown best in FIGURES 3 and 4. These L-shaped arms 90, 92, 94 are flexible and so positioned that one leg thereof extends upwardly and the other extends radially outwardly as best seen in FIGURE 3. The radial outwardly extending leg of each L-shaped arm 90, 92 and 94 is respectively received in spaced-apart openings 96, 98 and 100 extending upwardly from interior groove 28 in flange 26 of cap 16 and rests on and is retained in placing the upper edge of flange 34 of nozzle 32 as shown best in FIGURES 3 and 4. The bottom surface 85 of flange 86 is spaced apart from and beveled complementary to beveled surface 40 of nozzle 32. Advantageously bulb 82 is made of a resilient and pliable material such as polyethylene, so that when pressed downwardly toward the concavity of the upper portion of nozzle 32, L-shaped legs 92, 94 and 96 flex, allowing the beveled surface 85 of the bottom of flange 86 of bulb 82 to be pressed against beveled surface 40 as shown in FIGURE 8, forming a fluid-tight seal between bulb 82 and nozzle 32. As shown best in FIGURES 3 and 4, with bulb 82 in its normal quiescent position the outer peripheral surface 87 and the beveled surface 85 of flange 86 are spaced from cylindrical surface 36 of flange 34 and beveled surface 40 of nozzle 32 respectively, forming an annular fluid passageway 104. Dome portion 84 of diaphragm 82 has an aperture 106 passing therethrough which is preferably concentric to diaphragm 82. Surrounding aperture 106 and extending downwardly from the inner surface of dome portion 84 is a generally cylindrical tubular plunger 110. Advantageously plunger 110 is integral with bulb 82 and has a central bore 112 therein. Bore 112 is substantially coaxial with post 62 and is of a diameter substantially equal to the outer diameter thereof for slidably receiving post 62 therein. Plunger 110 is substantially rigid and has a wall thickness sufficient to overlie the respective transverse portions 74, 76 and 78 of the upper edges of vanes 54, 56 and 58. About the outer peripheral surface of the wall portion of plunger 110 are three series of successively descending inverted steps or cut-outs therein, each extending illustratively around 1/3 of its circumference and the series is repeated every 1/3 of the circumference or 120°, so that, as shown in FIGURE 6, there are triads of symmetrically placed steps in the wall, the steps of each triad being at the same height or axial position along the length of plunger 110. The inner peripheral surface 113 of the wall of plunger 110 is continuous and cylindrical as shown in FIGURES 3 and 6 and defines bore 112. Inner cylindrical wall 113 advantageously has a thickness slightly smaller than grooves 66, 68 and 70 in vanes 54, 65 and 58 respectively for slidable receipt therein. One such series of steps is shown in FIGURE 3 at 123a, 123b and 123c, a fourth step being at the level of the lower edge of plunger wall 113. The three series of steps in the outer cylindrical wall 113 are of graduated increasing distance from the lower-most edge 120 of plunger 110 toward the dome portion 84 of bulb 82, so that a line connecting the ends of the steps in each series is of helical contour. Illustratively shown in FIGURE 6 are three series of 4 steps with the steps of each series indicated by the refernce numerals 120, 121, 122 and 123 respectively, and the several series being designated by letters, "a," "b" and "c" respectively. Thus the first series has the steps 120a, 121a, 122a and 123a. Each series preferably has the same number of steps or cut-outs with those steps having like numerals being complementary and being of equal distance from lower-most edge 120.

With bulb 82 in assembled rest position in cap 16 over nozzle 32 as shown in FIGURE 3, the lower most surfaces 120c, 120a and 120b of plunger 110 are advantageously spaced but a small distance from upper transverse surfaces 74, 76 and 78 of vanes 54, 56 and 58 respectively. However, it may be desirable that surfaces 120b, 120a, and 120c abut transverse portions 74, 76 and 78 respectively. It is apparent that the relative rotative angular position of plunger 110 with respect to vanes 54, 56 and 58 respectively will determine the extent to which plunger 110 can be moved downwardly before plunger 110 will be stopped by having one series of complementary step surfaces engage respective transverse positions of vanes 54, 56 and 58 and hence that relative rotative portion determines how far bulb 82 can be depressed. In the position shown in FIGURE 3 the lower-most surfaces 120c, 120a and 120b of plunger 110 are disposed opposite transverse portions 74, 76, 78 of vanes 54, 56 and 58 respectively, so as to allow the miniimum inward movement of plunger 110. In this position no effective downward movement of dome portion 84 of bulb 82 is permitted and hence there will be continuous flow and no control metering of the fluid dispensed from orifice 52, in a manner to be described hereinbelow. Upon relative rotational displacement of nozzle 32 with respect to cap 16, such as 1/12 of a revolution of nozzle 32 in the clockwise direction (which in the illustrative case shown in FIGURE 3 is equivalent to one step) transverse portions 74, 76 and 78 of vanes 54, 56 and 58 respectively become vertically aligned with steps 121c, 121a and 121b, respectively, allowing plunger 110 to be moved downwardly a predetermined distance equivalent to the height of one step. In a smiliar manner, by selective rotational displacement of cap 16 and nozzle 32, plunger 110 may be moved downwardly any one of a number of predetermined distances, each corresponding to a position of cap 16 relative to nozzle 32, the maximum distance occurring when transverse vane portions 54, 56, 58 are vertically aligned with the top or uppermost steps 123c, 123a, 123b.

In assembled position diaphragm 82 is in fixed relative position with respect to cap 16 and rotates with cap 16. Upon tightening cap 16 upon threaded neck portion 14 of container 10, concentric ribs 24 are forced downwardly on the upper rim of neck 14, to provide a leak-proof seal. Container 10 with the dispenser thereon, is then placed in the inverted position as shown in FIGURE 1 and FIGURE 3. In this position the fluid in container 10 flows through neck portion 14 into cap 16 and into nozzle 32 via annular opening 104 between flange 86 of bulb 82, flange 34 and the beveled surfaces 40 of nozzle 32. At the same time, displaced air can enter cap 16 via aperture 106. Since orifice 52 in nozzle 32 is of capillary size, no liquid flows out of it. The fluid continues to flow into nozzle 32 displacing the air into container 10 until the fluid fills nozzle 32 and reaches a level covering the lower mouth of bore or opening 112, indicated by dotted line 140. Air is entrapped in the domed portion 84 of bulb 82 by the rising of the fluid to the level 140, and prevents any further flow into nozzle 32.

To explain the operation of the device, let it now be assumed that nozzle 32 is rotated relative to cap 16 so that vane portions 54, 56, 58 are aligned with the steps 120c, 120a and 120b, corresponding to the "Open" position described below. If pressure is then applied to the fluid or contents within container 10, such as by squeezing or compressing the side walls of container 10 inwardly, a pressure is exerted on the fluid contents within container 10 which is transmitted through the opening of neck 14 to the fluid on the upper surface of diaphragm or bulb 82. Since plunger surfaces 120c, 120a, and 120b abut transverse vane portions 74, 76 and 78 plunger 110, is stopped and cannot be depressed any further and hence bulb 82 cannot be depressed. The pressure is then communicated to the fluid in nozzle 32 via openings 104 and 106 and the container contents are ejected through openings 104 and 106 into the nozzle 32 and out through orifice 52 until cessation of inward compressive force on the walls of container 10. Upon removal of the compressive force upon the walls of container 10, outside air is sucked into orifice 52, taking the place of the fluid previously ejected. The double path from nozzle 32 to container 10 via openings 104 and 106 allows the air and fluid to exchange place in an easy manner.

Nozzle 32 is rotated relative to cap 16 to a selected position and if pressure is applied to the contents such as by squeezing the walls of container 10 inwardly, the compressive force is transmitted through the liquid to the upper surface of bulb 82 in a manner similar to that described above. As bulb 82 is first depressed by reason of the compressive force of the liquid thereon, L-shaped arms 90, 92 and 94 are flexed as shown in FIGURE 8 so that the lower peripheral edge of diaphragm 82 fits snugly against the walls of nozzle 32 and the fluid within cap 16 will be unable to flow into nozzle 32. Thus, the beveled surface of flange 86 of bulb 82 is forced into sealing engagement with flange surface 40 of nozzle 32 and closes opening 104. At the same time the downward movement of plunger 110 causes its inner cylindrical wall 113, to be slidably received in grooves 66, 68 and 70 and post 62 to be slidably received in bore 112 thereof, thereby closing any communication between nozzle 32 and the space enclosed by cap 16. Grooves 66, 68 and 70 are of sufficient depth to freely receive wall 113 for maximum displacement of plunger 110 and bore 112 sealably receives post 62 for the downward displacement of plunger 110 corresponding to all of steps 121, 122, and 123.

Thus, with diaphragm 82 in this compressed position any further flow of fluid from bottle 10 to nozzle 32 is prevented. This sealing action takes place almost immediately upon squeezing container 10. Continued squeezing causes diaphragm 84 to flex, forcing plunger 110 downward until the selected ones of its steps hit and are stopped by the vane portions 54, 56, 58. This flexure of diaphragm 84 exerts pressure through the air entrapped within it and upon the liquid in nozzle 32, now sealed off from cap 16. As a result, an amount of liquid is expelled from orifice 52, the quantity depending entirely upon the displacement of diaphragm 84 and hence upon the displacement of plunger 110.

By selective rotational displacement of cap 16 and nozzle 32, plunger 110 can be depressed inwardly a selected predetermined distance, with the maximum distance occurring when vane stop portions 74, 76 and 78 are vertically aligned with the top or uppermost steps here indicated at 123c, 123a, and 123b. The vertical distances or rise between the successive ones of steps 120 to 123 can be designed to be equal or varied as desired, and advantageously, as shown in the drawing, the vertical distance of each step is selected so that the first step 121a, one unit of liquid (such as a drop, a cubic centimeter, a teaspoonful, etc.) is expelled from aperture 52 in nozzle 32. For each succeeding step the rise or height is designed so that one additional unit is thus ejected. Thus in the embodiment illustrated any number of units from 1 to 3 may be selected to be dispensed by suitably positioning nozzle 32 relative to cap 16. It will be understood that any desired number of steps may be employed, resulting in any desired number of different quantities which may be dispensed. As an aid to the user for quickly determining the number of drops or other unit quantities of liquid which may be expelled from orifice 52, the outer surface of transverse step 130 is provided with a triplicate set of numerical scales reading 1, 2, 3, "Open" for each ⅓ of the circumference, as seen best in FIGURE 2. The "open" position occurs when lowermost surface 120 is vertically aligned with the vanes. Each numeral of the scale is aligned with a respective step such that numerals 1 are aligned with steps 121a, 121b and 121c respectively, and numerals 2 are aligned with steps 122a, 122b and 122c respectively and numerals 3 are aligned with steps 123a, 123b and 123c respectively. Arrows or other index marks 134 extend downwardly from flange 26 of cap 16 and are disposed every ⅓ of the circumference thereof and as shown each may be radially aligned with an L-shaped arm 104. Marks 134 cooperate with a series of vertical ridges 136 on the outer cylindrical surface 44 of nozzle 32 which in turn are aligned with respective numerals of numerical scales 132 as seen best in FIGURE 1. Thus, the index marks 134 cooperate with calibrated numerical scales 132 to determine the rotational position of nozzle 32 with respect to cap 16 so that the numbers to which index markers 134 point provide an indication of the number of drops or other unit quantities which can be dispensed from orifice 52 upon squeezing or compressing the flexible container 10.

It will be understood that many variations in structure from the embodiment described above are possible without deviating from the essence of the present invention.

While preferably three vanes or arms were shown, more or less may be used. Whatever number used, the same number of series of successive step surfaces should also be used. However, it is important to note that the use of three vanes provide excellent stability for plunger 110 for preventing vertical displacement when bulb 82 is compressed and is hence preferred. Also, the bulb may be of other shapes and forms rather than the dome shape as shown. Further, while nozzle 32 was shown as molded from a single piece, the vanes may be molded separately and joined to the nozzle in any convenient manner. If desired a protective cap, not shown, may be placed over orifice 52 during shipment or storage for preventing possible leakage from orifice 52. The cap may be secured to nozzle 32 by any convenient means such as a friction fit or threading.

Other ways of causing plunger 110 to be rotated relative to vanes 54, 56 and 58 may be used to avoid the necessity of rotating nozzle 32 in cap 16. Although screw threads have been shown as the manner of holding the closure assembly on the container, other means of clamping may be used.

While one method of sealing bore 112 defined by plunger 110 was shown, others may be used. For example the steps in the wall of plunger 110 may be of the entire wall width and post 62 to be extended to a point just below the uppermost step, so that when the plunger is first depressed, post 62 would be inserted within bore 112 above that top step to a point where plunger 110 is circumferentially complete, thereby completing the desired seal.

Further, while container 10 and the dispenser assembly have been shown in the inverted vertical position, satisfactory results will be achieved even if the device is displaced from the vertical, so long as sufficient fluid is entrapped in the nozzle and surrounds the outer surfaces of bulb 82.

A metering dispensing device has thus been disclosed for use on a threaded or other type of collapsible container having a plunger and a stop member in the path of the plunger within the dispenser device with the plunger and stop so inter-related that upon their relative rotational displacement about their axis the plunger travel is selectively limited thereby to accurately and consistently meter a selected amount of liquid to be dispensed from the container regardless of the compressive force exerted thereon. Further, while a selected metered amount of fluid may be dispensed, a continuous output may be also obtained. Also, if desired, the metering dispensing device may be used for obtaining a predetermined quantity of fluid continuously, regardless of the force exerted on the container, by selectably limiting the plunger movement and not rotatably displacing the stop member and plunger, which, if desired, may be made non-rotatable with respect to each other. Thus, a predetermined quantity of fluids will be consistently ejected when the bottle is squeezed.

While this device has been described as a fitment having threads permitting it to be assembled upon any conventional threaded container or bottle, it will be apparent that cap 16 may be formed integrally with the container to provide a unitary container-dispenser.

It will be apparent to those skilled in the art that various other changes may be made in the construction of the dropper without departing from the spirit and scope of this invention, which is defined by the appended claims.

What is claimed is:

1. An adjustable liquid dispenser fitment for use with a liquid containing flexible container having a discharge end comprising a hollow cap element open at both ends and adapted to have one of said ends sealably connected to the discharge end of said container, a nozzle element having a discharge orifice rotatably mounted to the other end of said cap element, a flexible diaphragm mounted transversely across said cap and adjacent to said other end thereof, said diaphragm having a movable portion adapted to be responsive to increase in pressure within said container, a generally tubular plunger having a bore therethrough and having one end fixed to the diaphragm movable portion for axially moving the other end of said plunger toward said nozzle element in response to increase in pressure within said container, said diaphragm having an aperture therethrough communicating with the bore of said tubular plunger for defining a liquid passage between the orifice in said nozzle element and said one end of said cap element, said plunger having a plurality of series of step surfaces in its outer wall, corresponding step surfaces of each series lying at predetermined distances from the other end of said plunger, each of said series of step surfaces disposed equally about the circumference of said plunger with corresponding step surfaces of each series lying in the same transverse plane, and stop means mounted within said nozzle element and coaxial to said plunger, said stop means having a closure rod axially aligned with said plunger and adapted to be slidably received within the bore of said plunger during movement of said diaphragm, said stop means having a plurality of arms extending radially outwardly from and spaced equidistant about said closure rod, each of said arms having a portion of the edge facing said plunger transversely aligned and being axially aligned for engaging a corresponding step surface, said arms being adapted to be disposed in axially opposed spaced relation to selected corresponding step surfaces for selectably determining the movement of said diaphragm movable portion in response to increase in pressure within said container, said nozzle element adapted to receive a measured amount of liquid when the container is inverted, said closure rod closing said liquid passage to isolate the interior of said container and the discharge orifice of said nozzle in response to initial movement of said plunger, said liquid passage remaining blocked while said diaphragm deforms to eject liquid from said discharge orifice so that the quantity of the liquid content of said nozzle element to be dispensed from said discharge opening may be adjustably determined.

2. An adjustable liquid dispenser fitment for use with a liquid containing flexible container having a discharge end comprising a hollow cap element open at both ends and adapted to have one of said ends sealably connected to the discharge end of said container, a nozzle element having a discharge orifice rotatably mounted to the other end of said cap element, a flexible diaphragm mounted transversely across said cap and adjacent to said other end thereof, said diaphragm having a movable portion adapted to be responsive to increase in pressure within said container, a generally tubular plunger having a bore therethrough and having one end fixed to the diaphragm movable portion for axially moving the other end of said plunger toward said nozzle element in response to increase in pressure within said container, said diaphragm having an aperture therethrough communicating with the bore of said tubular plunger for defining a liquid passage between the orifice in said nozzle element and said one end of said cap element, said plunger having a series of stepped surfaces about the outer peripheral surface of its wall at predetermined distances from its said other end, and a stop member fixedly mounted within said nozzle element and in coaxial relationship to said plunger, said stop member having a closure rod axially aligned with said plunger and adapted to be slidably received within the bore of said plunger during movement of said diaphragm, said stop member further having an arm extending radially outwardly from said closure rod and having a surface in opposed spaced axial relationship with said other end of said plunger for cooperatively engaging a selected step surface, said arm being adapted to be disposed in axially opposed spaced relation to a selected step surface for selectably determining the movement of said diaphragm movable portion in response to increase in pressure within said container to adjustably determine the quantity of the liquid dispensed from said discharge orifice, said closure rod blocking said liquid passage to isolate the interior of said container and the discharge orifice of said nozzle in response to initial movement of said plunger, said passage remaining blocked while said diaphragm deforms to eject liquid from said discharge orifice.

3. A metering dispenser, a fluid containing flexible container comprising a hollow cap element having an open end and adapted to communicate with the interior of said container, a nozzle element having a discharge orifice hermetically sealed to said cap element end, a flexible diaphragm mounted transversely across said cap and adjacent to said other end thereof, said diaphragm having a movable portion adapted to be responsive to increase in pressure within said container, means defining a fluid passage between the orifice of said nozzle element and said one end of said element cap, a generally tubular plunger having one end fixed to said diaphragm movable portion for axially moving the other end toward said nozzle element in response to increase in pressure within said container, said plunger having a series of step surfaces in its cylindrical wall at predetermined distances from its other end, a stop member mounted within said nozzle element and in coaxial relationship to said plunger, and having a surface in opposed spaced axial relationship with said other end of said plunger for cooperatively engaging a selected step surface, said nozzle element being turnable about its axis for deposing said arm surface in axial opposed spaced relation to a selected step surface on said plunger for selectably determining the movement of said diaphragm in response to increase in pressure within said container, and means responsive to axial movement of said diaphragm movable portion for blocking said fluid passage to isolate the discharge end of said container and the discharge orifice of said nozzle whereby the axial movement of said diaphragm movable portion may be adjusted to correspond to desired amount of fluid to be dispensed from said nozzle orifice.

4. An adjustable fluid dispenser fitment for use with a fluid containing flexible vessel having a discharge end comprising a hollow body member open at both ends and adapted to be connected at one end to the discharge end of said container, a nozzle element rotatably mounted and hermetically sealed to said body member adjacent its other end, a transverse flexible diaphragm mounted interiorally within said body member adjacent said other end thereof and having a movable portion, means defining a fluid passage between said one end of said body member and said nozzle, means responsive to the movement of said diaphragm movable portion for blocking said fluid passage, and means mounted on said diaphragm and nozzle element for adjustably limiting the movement of said diaphragm movable portion in response to increase in pressure within said container, said last mentioned means including a plunger having an end and a series of sequential stepped surfaces thereon of different distances from said end, and a stop member coaxial to said plunger having means thereon for cooperative engagement with selected step surfaces of said plunger for selectively limiting the movement of said diaphragm whereby the change in volume of said bulb may be adapted to correspond to desired amount of fluid to be dispensed from said nozzle element.

5. A metering dispenser for a fluid containing flexible container comprising a hollow cap member having an open end and adapted to communicate with the interior of said container, a nozzle element hermetically sealed to the other end of said cap member and having a discharge opening, an interior transverse diaphragm mounted adjacent said other end of said cap member and having a movable portion, said diaphragm movable portion being moved in response to increased fluid pressure within said container, means defining a fluid passage between said nozzle element and said open end of said cap member, means responsive to the movement of said diaphragm movable portion for blocking said fluid passage, and adjustable means mounted on said diaphragm and nozzle element for selectably limiting the movement of said diaphragm movable portion, said means being responsive to increase of fluid pressure within said container to adjustably determine the quantity of fluid dispensed from said discharge opening.

6. An adjustable fluid dispenser fitment for use with a fluid containing flexible container having a discharge end comprising a hollow cap member having an open end and a compressible transverse dome shaped diaphragm across and facing the other end, said cap member open end adapted to be sealably connected to the discharge end of said container, a nozzle element having one end hermetically sealed to the diaphragm end of said cap member, the other end of said nozzle element having a discharge orifice therein, means defining a fluid passage between said nozzle and said open end of said cap member, said nozzle element adapted to receive a measured amount of fluid when the container is inverted, adjustable means mounted on said nozzle and on the surface of said diaphragm facing said other end of said cap for limiting the movement of said diaphragm, and means responsive to the initial movement of said diaphragm for blocking said fluid passage to isolate said nozzle orifice from said open end of said cap member while said diaphragm deforms to eject fluid from said nozzle orifice, whereby the movement of said diaphragm resulting from the compression of the container may be adapted to correspond to desired amount of liquid to be dispensed from the container.

7. A metering dispenser for a flexible fluid container comprising a hollow first member having an open end and adapted to communicate with the interior of said container, a nozzle element hermetically sealed to said first member end and having a discharge opening, a diaphragm mounted within said first member and extending substantially thereacross, said diaphragm having a movable portion adapted to be responsive to pressure within said container, means defining a fluid passage between said first member and said nozzle element, said nozzle element adapted to receive a measured amount of fluid when the container is inverted, means responsive to movement of said diaphragm movable portion for closing said fluid passage, and adjustable means mounted on said diaphragm and nozzle element for selectably determining the movement of said diaphragm movable portion, said means being responsive to increase of pressure within said container to adjustably determine the quantity of the fluid contents of said nozzle element to be dispensed from said discharge opening.

8. A metering dispenser for a flexible fluid container comprising a hollow first member having an open end and adapted to communicate with the interior of said container, a nozzle element hermetically sealed to said first member end and having a discharge opening, a diaphragm mounted within said first member and extending substantially thereacross, said diaphragm having a portion movable in response to increase of fluid pressure within said container, means defining a fluid passage between said first member and said nozzle element, and adjustable means mounted on said diaphragm and nozzle element for selectably determining the movement of said diaphragm movable portion, said means being responsive to increase of pressure within said container to adjustably determine the quantity of fluid dispensed from said discharge opening.

9. A metering dispenser for a flexible container containing dispensable fluid comprising a hollow first member having an open end and adapted to communicate with the interior of said container, a nozzle element hermetically sealed to said first member and having a discharge opening, and adjustable means for ejecting a quantity of fluid through said nozzle discharge opening, said means communicating with said container interior and being actuated by increase of fluid pressure within said container for dispensing said fluid, said fluid within said container being dispensable through said nozzle discharge opening.

10. A metering dispenser for a flexible fluid container comprising a first member having an open end and adapted to communicate with the interior of said container, said first member having a nozzle portion at the other end with a discharge opening therein, a diaphragm mounted within said first member and extending substantially thereacross, said diaphragm having a movable portion adapted to be responsive to fluid pressure within said container, means defining a fluid passage between said open end and said nozzle opening, means responsive to the movement of said diaphragm movable portion for blocking said fluid passage, and adjustable means mounted on said diaphragm and nozzle portion for selectably determining the movement of said diaphragm movable portion, said movement being actuated by increase in fluid pressure within said container to adjustably determine the quantity of fluid dispensed from said discharge opening.

11. A metering dispenser for a flexible container containing dispensable fluid comprising a nozzle element having an open end and adapted to communicate with the interior of said container, said nozzle element having a discharge opening, and means for selectably determining the quantity of fluid dispensed through said nozzle discharge opening, said means communicating with said container interior and being actuated by increase of fluid pressure within said container for dispensing said fluid, said fluid within said container being dispensable through said nozzle discharge opening.

12. A metering dispenser for a flexible fluid container comprising a nozzle element having an open end and adapted to communicate with the interior of said container, said nozzle element having a discharge opening, a diaphragm mounted within said nozzle element and extending substantially thereacross, said diaphragm being rotatable with respect to said nozzle elements having a movable portion adapted to be responsive to pressure within said container, means defining a fluid passage between said open end and said discharge opening, means responsive to the movement of said diaphragm movable portion for blocking said fluid passage, and first and second cooperable stop members carried respectively by said diaphragm and said nozzle element for limiting the advance of said diaphragm, one of said stop members having an end surface with portions of differing distance with respect to said other stop member and individually and selectably engageable with said other stop member for adjustably determining the movement of said diaphragm whereby the movement of said diaphragm may be adjusted to correspond to the desired amount of fluid to be dispensed.

13. A metering dispenser for a flexible container containing fluid comprising a nozzle element having an open end and adapted to communicate with the interior of said container, said nozzle element having a discharge opening, a diaphragm mounted within said nozzle element and extending substantially there across, said diaphragm having a movable portion adapted to be responsive to pressure within said container, means defining a fluid passage between said discharge opening and said open end of said nozzle element, and means mounted on said diaphragm and nozzle element for adjustably limiting the movement of said diaphragm movable portion in response to increase in pressure within said container to predetermine the quantity of fluid dispensed from said discharge opening, said last mentioned means including a plunger having an end and a series of sequential step surfaces thereon of different distances from said end, and a stop member coaxial to said plunger having means thereon for cooperative engagement with selected step surfaces of said plunger for selectively limiting the movement of said diaphragm.

14. A fluid dispenser fitment as in claim 6 wherein said diaphragm movement limiting means includes a first member having an end and a series of sequential stepped surfaces thereon of different distances from said end and a stop member coaxial to said first member having means thereon for cooperative engagement with the selected stepped surfaces of said first member for selectably limiting movement of said diaphragm.

15. A metering dispenser for a flexible fluid container comprising a nozzle element having an open end and adapted to communicate with the interior of said container, said nozzle element having a discharge opening, a diaphragm element mounted within said nozzle element and extending substantially there across, said diaphragm element having a movable portion adapted to be responsive to pressure within said container, one of said elements having a plunger mounted thereon, the other of said elements having a guide member mounted thereon and positioned and shaped to receive said plunger, and means defining a fluid passage between said discharge opening and open end of said nozzle element, said plunger and guide member being axially slidable relative to one another upon movement of said diaphragm element, and said guide member including selectable stop means for engagement with said plunger to limit inward movement of said diaphragm element whereby the movement of said diaphragm may be adjusted to correspond to desired amounts of fluid to be dispensed.

16. A metering dispenser for a flexible container comprising a hollow cap member having an open end and adapted to communicate with the interior of said container, a nozzle element rotatably mounted on said cap member, a diaphragm mounted within said cap member and extending substantially there across, said diaphragm having a movable portion adapted to be responsive to pressure within said container, means defining a fluid passage between said nozzle element and said open of said cap member, means responsive to movement of said diaphragm movable portion for blocking said fluid passage, means mounted on said diaphragm and nozzle element for adjustably limiting the movement of said diaphragm movable portion, said movement being in response to increase of pressure within said container, said means including a plunger and an integral guide member positioned and adapted to receive said plunger, said plunger and guide member being axially slidable relative to one another upon movement of said diaphragm movable portion, said guide member including selectable stop means for engagement with said plunger to limit inward movement of said diaphragm movable portion, said stop means being at different distances from said plunger for different relative rotational positions of said nozzle element and said cap member.

References Cited in the file of this patent

UNITED STATES PATENTS

| | | |
|---|---|---|
| 1,392,600 | Rose | Oct. 4, 1921 |
| 2,133,831 | Pritchard | Oct. 18, 1938 |
| 2,428,577 | Mathis | Oct. 7, 1947 |
| 2,884,164 | Kleid | Apr. 28, 1959 |

UNITED STATES PATENT OFFICE
CERTIFICATE OF CORRECTION

Patent No. 3,125,250                                March 17, 1964

Gene Ballin

It is hereby certified that error appears in the above numbered patent requiring correction and that the said Letters Patent should read as corrected below.

Column 12, line 75, after "open" insert -- end --.

Signed and sealed this 14th day of July 1964.

(SEAL)

Attest:

ESTON G. JOHNSON                                EDWARD J. BRENNER
Attesting Officer                                    Commissioner of Patents